Feb. 12, 1952 L. H. DAVIS ET AL 2,585,746
ADJUSTABLE SCHMIDT TELEVISION PROJECTOR MOUNTING
Filed Sept. 29, 1948 3 Sheets-Sheet 1

INVENTORS
LEWIS H. DAVIS
& GEORGE H. BLAKER
BY
ATTORNEY

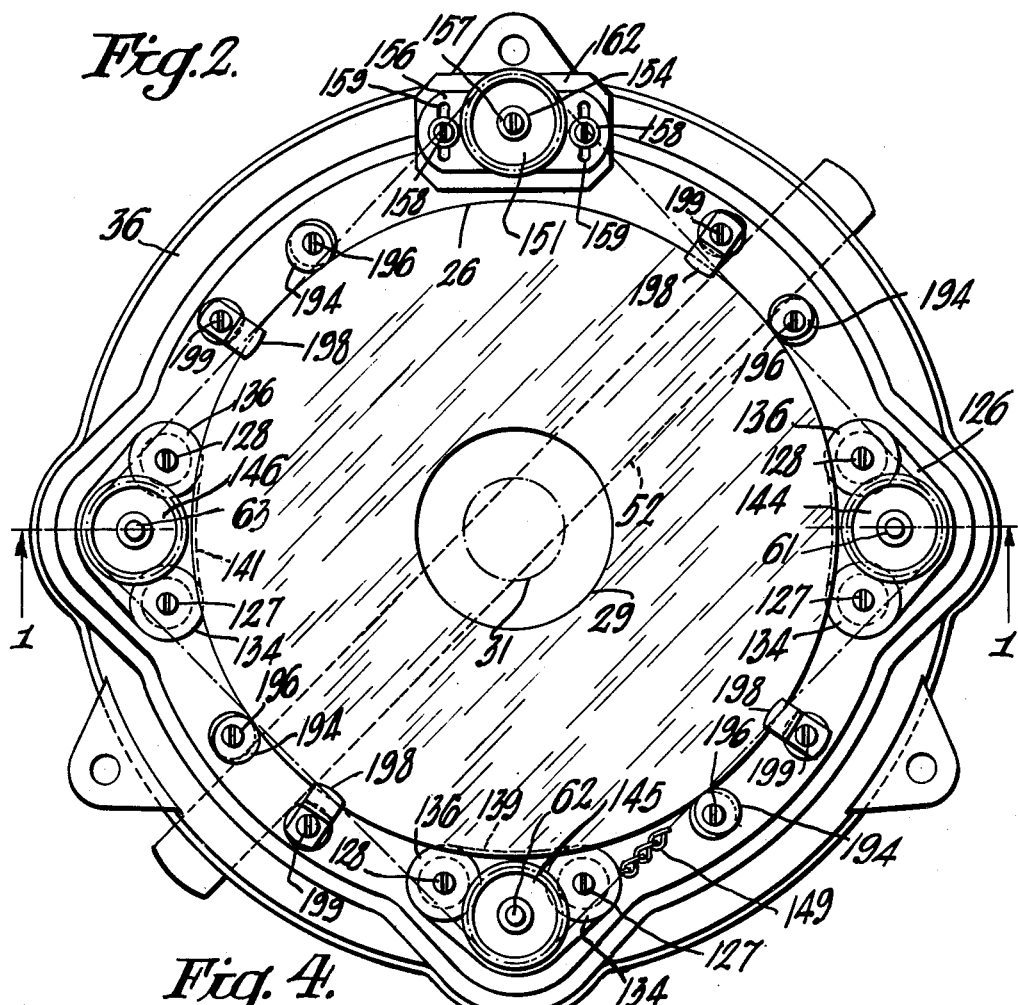

Feb. 12, 1952     L. H. DAVIS ET AL     2,585,746
ADJUSTABLE SCHMIDT TELEVISION PROJECTOR MOUNTING
Filed Sept. 29, 1948     3 Sheets-Sheet 3
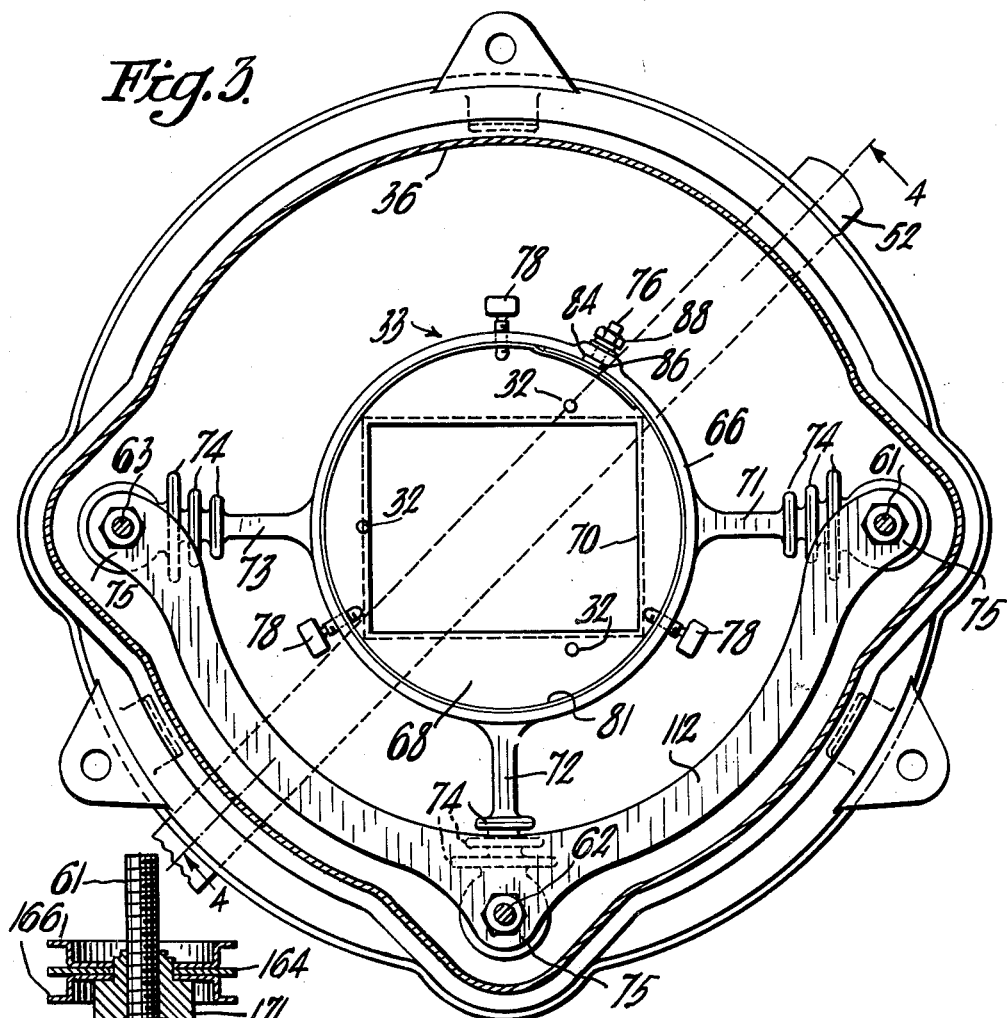
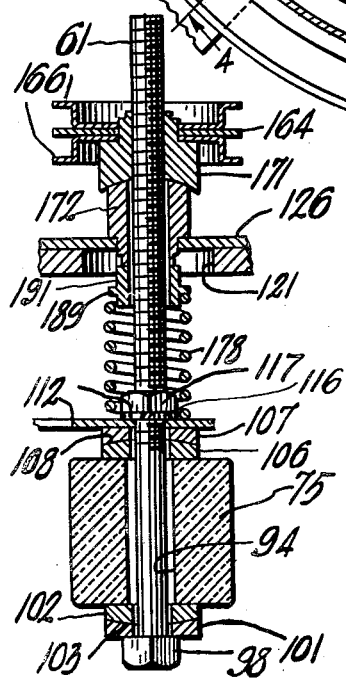
INVENTORS
LEWIS H. DAVIS
& GEORGE H. BLAKER
BY
ATTORNEY Patented Feb. 12, 1952

2,585,746

UNITED STATES PATENT OFFICE 2,585,746

ADJUSTABLE SCHMIDT TELEVISION PROJECTOR MOUNTING

Lewis H. Davis, Wayne, Pa., and George H. Blaker, Moorestown, N. J., assignors to Radio Corporation of America, a corporation of Delaware Application September 29, 1948, Serial No. 51,774

3 Claims. (Cl. 177—319)

1

The present invention relates to a system for projecting images produced by an image producing device of a television receiver, and more particularly, though not necessarily exclusively, to an improved and simplified image projector having novel adjustable features. The image projector with which the invention is concerned comprises a spherical mirror, an aspheric zone plate, and the image producing surface of a cathode ray tube for projecting an image upon a screen which may be readily located in a preferred position with respect to the projector. In accordance with the invention, the supporting means for the cathode ray tube is readily installed and adjusted and means are provided for maintaining a desired adjustment. The invention also provides, in one of its aspects, for support and adjustment of the aspheric zone plate which is an important optical part of the projector.

In United States Patent No. 2,273,801, granted February 17, 1942, to D. O. Landis, there is disclosed an arrangement whereby a spherical mirror or reflecting surface is arranged to direct and focus light rays forming the enlarged television image upon a viewing screen with the aid of an aspheric correcting plate or correcting lens. The organization of essential optical parts shown in this Landis patent must, for best results, be aligned and spaced in a certain definite relationship, and the primary aim of the present invention is to provide methods of and means for readily mounting and adjusting important optical parts of a reflecting optical projector embodying the invention.

The second important aim or object is to provide a novel adjustable support for the cathode ray tube which is removably associated with the parts of a projector employing reflective optics.

Still another object is to provide novel simultaneously operable adjustable means for supporting and positioning a cathode ray tube in an image projecting system.

Other objects and advantages of the invention, will, of course, become apparent and immediately suggest themselves to those skilled in the art to which the invention is directed from a reading of the following specification in connection with the accompanying drawings in which:

Fig. 2 is a top plan view of the apparatus of Fig. 1;

Fig. 3 is a view in horizontal section of the projector of Fig. 1, the section being taken in line 3—3 thereof;

Fig. 4 is a fragmentary vertical section of the projector being taken substantially on line 4—4 which is indicated on Fig. 3; and Fig. 5 is a detailed view in section of a portion of the tube holder of the invention, the section being taken on line 5—5 of Fig. 1.

Figure 1:
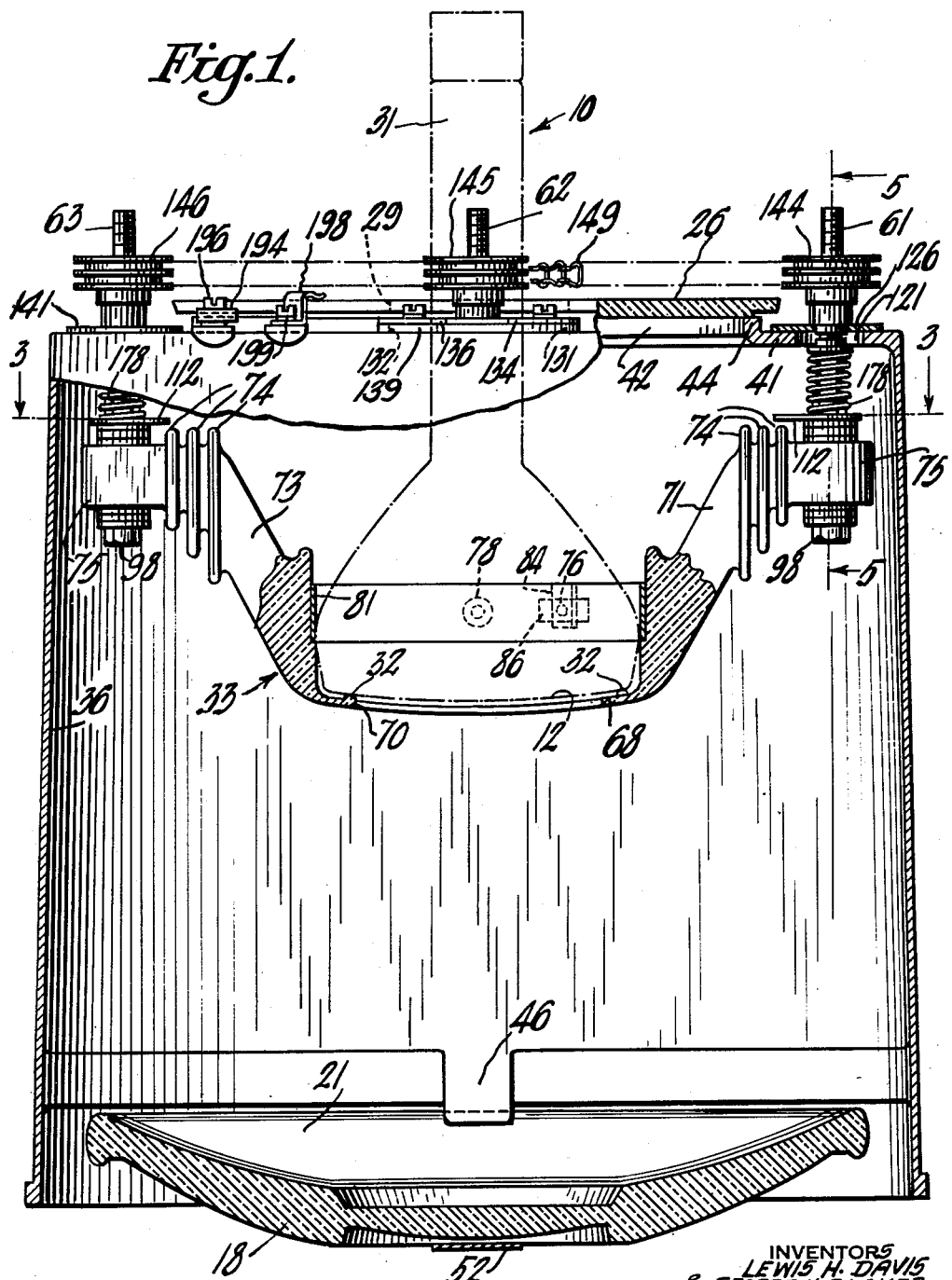
Fig. 1 is a view in sectional elevation of a projector embodying the invention, the section being taken in line 1—1 of Fig. 2.

Referring to Figs. 1 and 2 of the drawing, which show the general organization of a television projector embodying the invention in one of its forms, an image producing tube 10 is indicated in dot-dash outline which has a television image produced on its luminescent target 12. This tube projects a produced television image or other luminous patterns toward a reflection element 18 which has a spherical reflecting surface 21. The image which has been projected upon the reflecting surface 21 is then reflected therefrom toward a suitable viewing screen (not shown). At an intermediate point in the optical path an aspheric zone plate 26 (also termed a "correcting plate" or "correcting lens") is positioned to receive the light reflected from the reflecting surface 21. The aspheric zone plate 26 is arranged externally to the light path from the tube to the reflector and is preferably axially aligned with each. This zone plate is arranged to correct for any spherical aberrations introduced into any of the light rays by the curved reflecting surface 21 of the member 18 so that a sharply focused reproduction of the image developed on the fluorescent or luminescent target area 12 of the tube 10 is produced on the previously mentioned viewing screen. The aspheric zone plate 26 has a central opening 29 for the purpose of accommodating the tube neck 31 and, if desired, the deflecting yoke (not shown) for producing deflection of the cathode ray beam within the tube 10. The curved face 12 of the tube 10, which will be approximately spherical, or exactly spherical, rests upon projections 32 formed on the ring-like holder indicated generally by reference character 33. A discussion of contour of the target face of a tube designed for use in a reflective optical projector is to be found in the previously mentioned Landis Patent No. 2,273,801. The zone plate 26 as well as the tube holder 33 is located and supported through the agency of a cylindrical member 36.

The housing or barrel 36 is generally cylindrical and comprises a top 41 which has an aperture 42 therein substantially coextensive with the aspheric zone plate 26. The opening 42 is surrounded by an upturned cylindrical boss 44 which provides an annular surface upon which a spheric zone plate 26 rests.

The end of the barrel 36 opposite to the top 41 has three projections 46, the extreme tips 48 of which define a circle against which the optically correct spherical surface 21 of member 18 is pressed by a spring member 52. The spring member 52 projects through slots 54 in the housing and resiliently presses against the lower edge of slot, the upward reaction of the spring against the member 18 being taken by the edges 48 of the projections 46. At several points, such for example, at the projections 46 and in the neighborhood of the slots 54 the barrel 36 is bulged outwardly as indicated by reference character 58 on Fig. 4 of the drawings. The entire barrel 36 is of such a nature that it may be readily formed by a casting process and the need for accurate machining is at a minimum. However, by reason of the arrangement of the projector in accordance with this invention, accuracy of location of the several optical parts is readily obtained and maintained without the need for employing costly machine tool methods of preparation of the barrel for use.

The tube holder 33, mentioned above, is suspended from or supported by a plurality of studs, three in number in the present example, numbered 61 to 63. The manner in which the studs are carried by the housing 36 and, more particularly, the top 41 thereof will be discussed more in detail hereinafter. To return to the tube holder 33, it is seen to comprise a cup-like center portion 66 with a lower generally curved wall 68. The wall 68 is provided with an opening 70 which is preferably approximately of the size and area of the image which is to be produced on the end 12 of the tube 10. The wall 68 is formed in any suitable manner to provide the above mentioned projections 32.

The principal supports for the cup shaped portion 66 are the three arms 71, 72, and 73. Each arm ends in a generally cylindrical portion 75 as shown by Figs. 1 and 5 of the drawings and includes a series of ring-like projections 74. These last named projections add to the effectiveness of the insulation which is provided for the high voltage connection comprising a stud 76 which is electrically connected to the second anode (not shown) of the tube 10.

The tube 10 is held in place after it is seated in the projections 32 by means of three thumb screws 78 which are preferably formed of a yieldable insulating material so as to avoid crushing of the comparatively fragile envelope of the tube 10.

In the arrangement of the illustrative embodiment electrical communication between the second anode stud connection (not shown) on the tube 10 is conveniently provided by a strip 81 of conductive material, brass, for example. The previously mentioned stud 76 is secured in any suitable manner to the strip 81 near one end and the opposite end overlaps, a slot or aperture (not shown) being provided to accommodate any projection which may be formed by securing the stud 76 to the strip 81. An axial slot 84 receives the generally square head 86 of the stud 76. The nut 88 provides a binding connection for the high voltage second anode lead (not shown) which is usually in the form of a heavily insulated cable.

The entire tube holder, as indicated in the foregoing, is preferably constructed of insulating material, an arrangement which is necessary if the high voltage connection to the second anode is made as suggested herein. A suitable material from which the tube holder 33 may be cast is known as melamine. Melamine is considered as a trimer of cyanamide $CH_2N_2$. The lightness, moldability and insulating properties of the suggested material are useful properties for purposes of construction and insulation.

The manner in which the studs 61 to 63 are positioned in and secured to the respective portions 75 of the arms 71 to 73 will now be described with particular reference to the more detailed showing of the Fig. 5 of the drawings. The stud 61 is assembled to the portion 75 and the arm 71 in the same manner as the remaining studs are assembled to their respective arms, so that the description of one will suffice for all three. The portion 75 has a bore 94 which is larger in diameter than the outside diameter of the stud 61. The stud, as shown, may, for example, be a machine bolt having the usual bolt head 98 formed at its end. A pair of washers 101 and 102 are located between the bolt head and the portion 75. These washers are provided with cooperating spherical surfaces as indicated for reference character 103. The washer 101 has a concave spherical surface and the washer 102 has a convex spherical surface. Another pair of washers 106 and 107 having cooperating spherical surfaces as indicated by reference character 108 is also provided for seating against the upper surface of the portion 75. It will be seen from the parts thus far described in connection with Fig. 5 of the drawings that the stud 61 may be rotated slightly about a center which coincides with the centers of the spherical surfaces 103 and 108. A brace 112, best shown in Fig. 3 of the drawings, is provided with three apertures which are spaced to receive the three studs 61 to 63. A lock washer and nut 116 and 117 serve to clamp the stud and spherical washer assembly and the template brace 112 in a desired position with respect to the portion 75 of the arm 71. Similar arrangements also clamp the respective parts in position on the other studs.

The assembly comprising the tube holder 33, the studs 61 to 63 and the template 112 may be aligned by providing a fixture or jig (not shown) which has three substantially parallel holes which are spaced to receive the ends of the studs 61 to 63. The spacing of the holes in the jig is preferably reasonably accurate for the purpose of promoting convenience of assembly of the studs to the barrels. The means to receive the studs have some degree of freedom of adjustment. With the entire tube holder assembly rather loosely joined together all of the nuts 117 may be tightened while the studs are held in parallel relationship in the holes of the jig.

The tube holder assembly aligned as just described is adjustably mounted in a special manner in accordance with the invention in the top 41 of the barrel 36. To accommodate the studs, enlarged holes 121, one of which appears in Figs. 1 and 5 of the drawings, are provided.

A bearing plate 126 (Figs. 1 and 5) rests on the end 41 of the barrel over the opening 121. This bearing plate may be clamped tightly in a selected position by means of screws 127 and 128 (Fig. 2) engaged in tapped holes in the cover plate and so that it may be moved to the selected position above mentioned, the bearing plate is provided with enlarged openings 131 and 132 (Fig. 1) to accommodate the screws 127 and 128. A washer is provided for each screw designated 134 and 136. The bearing plate 126 is, therefore clamped between the washers 134 and 136 and the top 41 when the screws 127 and 128 are tightened.

Each one of the remaining studs 62 and 63 (Fig. 1) are provided with a bearing plate 139 and 141 similar in all respects to the bearing plate 126 for the stud 61. Screws and washers are provided which are given like reference characters.

Simultaneous longitudinal adjustment of the studs 61 to 63 is provided by sprocket wheels designated by reference characters 144 to 146. These wheels are driven simultaneously by a chain 149 which also passes over an idle sprocket wheel 151. The idle sprocket wheel is journalled on a shaft 154 which is secured to a bracket 156. The shaft is hollow and surrounds a screw 157 which can be tightened to prevent rotation of the idler. The latter is adjustably mounted by screws 158 engaged in elongated slots 159 on a plate 162. The plate 162 is secured in any suitable manner to the top 41 of the housing 36. Radial adjustment of the idler sprocket 148 is sufficient for all practical purposes.

The sprockets 144 to 146 and the idler 151 are similar in construction and comprise a toothed disc 164 (Fig. 5) clamped between two flanged guide plates 166 for the chain. The application of the sprocket 144 to the stud 61 as shown in Fig. 5 is illustrative of the mounting of the two remaining sprockets 145 and 146.

Referring again to Fig. 5, the sprocket 164 is secured to an internally threaded nut 171, the lower surface of which is concave and spherical. The spherical surface of this nut rests on the convex spherical surface of an apertured member 172 which is secured to the previously described plate 126. The means by which the plate 126 and also the plates 139 and 141 are made adjustable was described above. A helical spring 178 is in compression between the template member 112 and a circular flange 189 formed on a collar 191 which is slideable on the stud 61. The collar 191 reacts against the lower end of the apertured member 172.

There remains to be given a detailed description of the means for adjustably holding aspheric zone plate 26 in position on the upper surface 44 of the circular projection 42. A plurality of eccentric washers 194, three in number in the illustrative example, are mounted on screws 196. These washers may be rotated to engage against the outer periphery of the correcting plate when it is in the desired position. Following it the screws 196 may be tightened to maintain radial alignment of the correcting plate. The correcting plate is held in position against the rim 44 by means of spring fingers 198, four in number in the illustrative example, which are clamped in position on the cover 41 by means of screws 199. The correcting plate may be raised without disturbing the setting of the eccentric washer 194 by loosening the screws 199 and rotating the spring fingers out of the way when the correcting plate is to be lifted.

The suggested procedure now to be given may be followed as a convenient method of adjusting and aligning the parts. A test light bulb (not shown) having the facial configuration of the face 12 of the tube and bearing an image in the form of the design that may be mounted in the tube holder in the projections 32 is provided. This lamp will then simulate the cathode ray tube 10 as far as the production of the projectable image is concerned. A screen (not shown) may be provided to receive the image projected by the test pattern. The screen is arranged to be parallel to the aspheric zone plate 26 and is displaced from this zone plate by a distance determined by the throw of the system.

With the three sprocket wheels assembled approximately in their correct position, the aspheric zone plate 26 and the tube holder 33 are moved across the top 41 of the housing 36 until the projected test pattern indicates that the correcting plate and the tube holder are optically aligned with the spherical mirror. The screws 127 and 128, which secure the bearing plates 126, 139 and 141 in position on the top of the housing, are tightened. The correcting plate 26 is locked in place by means of the eccentric washers 194 and the spring clips 198. The chain 149 is assembled on the three sprocket wheels and on the idler sprocket wheel. The projected image is focused by rotating the three sprocket wheels simultaneously by means of the chain to raise or lower the tube holder 33 as required. When the system has been focused by observing the pattern projected on the screen, the tube holder 33 is locked in position by tightening the screw in the center of the idler sprocket wheel.

The invention claimed is:

1. A projector for projecting the luminous image produced at the substantially spherical face of a cathode ray tube comprising; an optical light receiving element having a substantially spherical surface, an aspheric correcting plate to receive light reflected from said substantially spherical surface, a supporting member for said correcting plate, a tube holder having means to support the cathode ray tube by engagement with its substantially spherical face, a plurality of rods extending from said supporting member for said correcting plate for carrying said tube holder, said rods having an extensible screw threaded connection with said supporting member to provide for axial adjustment of the position of said tube face, means for operating said screw threaded connections simultaneously, and means for positioning said substantially spherical surface of said light receiving member in a desired location with respect to said aspheric correcting plate.

2. A projector for projecting the luminous image produced at the substantially spherical target face of a cathode ray tube comprising; an optical light receiving element have a substantially spherical surface, an aspheric correcting plate to receive light reflected from said substantially spherical surface, a supporting member for said correcting plate, a tube holder comprising a cup shaped member, a plurality of arms extending radially from said member, a rod for each arm, means comprising spherical interengaging surfaces providing for alignment of said rods with respect to said arms, screw threaded members for each rod having universal engagement with said supporting member for said correcting plate, and means for simultaneously operating said screw threaded members.

3. The combination of claim 2 wherein said screw threaded members engaging for said rods are in the form of sprockets, a chain engaging said sprockets, and an additional idler sprocket for guiding said chain.

LEWIS H. DAVIS.
GEORGE H. BLAKER.

(References on following page)

REFERENCES CITED

The following references are of record in the file of this patent:

UNITED STATES PATENTS

| Number | Name | Date |
|---|---|---|
| 1,138,848 | Dake | May 11, 1915 |
| 2,097,537 | Snyder | Nov. 2, 1937 |
| 2,273,801 | Landis | Feb. 17, 1942 |
| 2,424,513 | Stephan | July 22, 1947 |
| 2,455,476 | Epstein | Dec. 7, 1948 |
| 2,466,331 | Schnable | Apr. 5, 1949 |
| 2,467,185 | Cady | Apr. 12, 1949 |
| 2,476,898 | Nicoll | July 19, 1949 |

OTHER REFERENCES

"Electronics," Apr. 1948, pages 74, 73, 75.